United States Patent Office 2,956,671
Patented Oct. 18, 1960

2,956,671

COMPOSITE FILM WRAPPING

Ralph T. K. Cornwell, Rosemont, Pa., assignor to American Viscose Corporation, Philadelphia, Pa., a corporation of Delaware No Drawing. Filed Dec. 8, 1958, Ser. No. 778,572

16 Claims. (Cl. 206—46)

The present invention relates to composite film structure and to packages formed therefrom, and particularly to heat-sealable films and heat-sealed packages which are vapor impervious to an extent adapting them for vacuum packing or the packaging of goods in the presence of an inert gas. This application is a continuation-in-part of application Serial No. 519,004, filed June 29, 1955, now abandoned.

The invention has particular utility in the packaging of perishable goods such as certain foods and pharmaceuticals which are necessarily isolated from air, or gaseous contaminates of the atmosphere, until the goods are consumed. Further utility is realized in packaging goods which discharge toxic, corrosive, or malodorous vapors. A minimum of contact with air is desirable, for example, in the packaging of potato chips, coffee, tea, frozen foods, and certain meat products which are sold in a refrigerated but unfrozen condition.

It is an object of this invention to provide a highly vapor-impermeable readily-sealed flexible packaging material which comprises as a base material a non-fibrous cellulosic sheet. Another object is to provide a packaging material that is coated on both sides and is coated on one side with an abrasion-resistant and gas or vapor-resistant thermoplastic resin and thereafter coated on the other side with a different heavier thermoplastic polymer coating without marring the surface or the transparency of the first applied coating. Still another object is to utilize a polyolefin, particularly polyethylene or polypropylene, as the heavier thermoplastic coating on the side facing inwardly of containers or wrappers made therefrom. Other objects and features of the invention will be apparent from the following description of the invention.

In brief, the invention consists of wrappers and containers comprising a cellulosic base (e.g. regenerated cellulose or cellulose ethers) coated on the outer surface with a layer of a saran and on the inner surface with a layer of a polyolefin with the sealing thereof being accomplished by the heat sealing of portions of the inner polyolefin-coated surface.

It has now been found quite unexpectedly that this novel combination of materials very satisfactorily performs all these functions; i.e. a package formed according to the present invention is flexible, transparent, heat sealable and both gas and moisture impermeable under the conditions of use. This is indeed surprising because none of the components of the composite film disclosed and claimed herein will perform all of these functions.

Thus it is well known that neither cellophane (regenerated cellulose) nor a cellulose ether film alone is gas or vapor impermeable, nor is it heat sealable. Although sarans (vinylidene chloride interpolymers) alone are vapor impermeable to a degree, it has now been found that one could not prepare a package using saran alone, or saran coated cellulosic films, which package when heat sealed, saran to saran, is gas or vapor impermeable enough to hold a vacuum. This is so since using the thickness of saran necessary to prevent passage of gas through the saran or saran-cellulosic film, one cannot obtain a heat seal which will prevent passage of gas or vapor. This may be due to either the brittleness of the saran after being joined to itself and subjected to heat and pressure, or it may be due to incomplete sealing resulting from migration of the saran while being joined and subjected to heat and pressure leaving portions of the joined cellulosic film void of any substantial amount of joined saran. Needless to say, joints (or seals) of this type are not vapor impermeable. It is well known, of course, that cellulosic film coated with sufficient saran to preclude the passage of gas (through the coated film not the sealed portion) can be heat sealed if one is interested only in preventing the contents of a package formed therefrom from being contaminated by handling, by solid material, or some other agent of this sort. On the other hand, although polyolefins (e.g. polyethylene and polypropylene) form an adequate heat seal, they are not gas or vapor impermeable; the latter is true of cellulosic films coated with polyolefins also. Thus, none of the components, nor any of the combinations thereof known in the prior art were capable of performing the ultimate functions necessary for the purposes of this invention, i.e., none of the components nor any of the known combinations thereof were capable of forming a heat sealed vapor impermeable package or container.

Polyethylene coatings have been cast on a surface of cellophane sheets moistureproofed with nitrocellulose coatings on the opposite side. One disadvantage in the preparation of this type of sheet is that the moistureproof coating is easily marked during the coating operation and becomes cloudy. As previously explained, an excellent seal is obtained by heat sealing polyethylene to polyethylene surfaces which (1) enables the packaging of liquids such as pickles in brine, sauerkraut, fruit juice concentrate, etc. and (2) permits evacuation of the air from the package so that various food products can be packaged in vaccuo. The usual nitrocellulose coating furnishes resistance to the transmission of water vapor while the transmission of oxygen through such a film is rather high. When, in accordance with this invention, saran is used to moistureproof a cellophane sheet coated on the opposite side with polyolefin, several additional advantages are obtained including (1) the saran coating is neither marked nor does it become cloudy during the polyolefin coating operation and (2) the water vapor transmission rate of the film is improved along with the oxygen transmission rate. Thus, packages wrapped in the sheet of this invention will hold a vacuum longer and give better protection from atmospheric oxygen. The composite film has a clearer, more attractive appearance and hence more sales appeal than when conventional moistureproof coating is used.

The sheet material from which the wrapper or container is fabricated comprises a base of regenerated cellulose film or cellulose ether film which is impregnated with a material called an anchoring agent capable of adhering both coatings to the base, such as described in the Cornwell Patents Nos. 2,686,744 and 2,575,443 or copending application Serial No. 518,947, filed by Justice and Rosser on June 29, 1955. The base film after acquiring the anchoring agent is preferably coated first on one side with the saran to be used for when the saran is applied from solution it is necessary to heat the saran-coated cellophane at somewhat higher temperatures than the softening point of the polyolefin to effectively remove all of the solvent.

The cellulosic base sheet contemplated by the present invention includes those derived from regenerated cellulose and cellulose ethers. The regenerated cellulose film may be prepared by the well-known viscose process, from cuprammonium solutions, or by regenerating cellulose from cellulose ethers or esters. The cellulose ethers which may be used as the base sheet include hydroxyalkyl ethers, preferably hydroxyethyl cellulose; alkyl ethers, e.g. methyl and ethyl cellulose; and carboxyalkyl ethers, such as carboxymethyl cellulose.

The sarans contemplated by this invention are those vinylidene chloride interpolymers having high impermeability to vapors generally and high vinylidene chloride/low intermonomer ratios. The commercially important binary or ternary interpolymers of high vinylidene chloride content are preferable because of their excellent resistance to moisture-vapor, oxygen, carbon dioxide and nitrogen transmission. These features of these interpolymers are said to result from strong intermolecular secondary valence forces which provide good resistance to polar as well as non-polar type vapors.

The vinylidene chloride interpolymers useful for this invention possess a vinylidene chloride content of more than 50% and up to 95% by weight of the polymeric product. As a practical matter, it is generally necessary that the vinylidene chloride content be 75% by weight or more, and in the preferred embodiment, the vinylidene chloride content is between about 85% and 95% by weight. These interpolymers having the above described vinylidene chloride content may be interpolymerized with one, two or more other monomers, preferred polymeric products being copolymers or terpolymers of vinylidene chloride and one or more monomers selected from the group consisting of alkyl methacrylates wherein the alkyl chain contains 8 to 18 carbon atoms as described in application Serial No. 642,939, lower alkyl acrylates as described in application Serial No. 677,781, acrylonitrile and vinyl chloride.

Examples of the monomeric materials suitable for the preparation of sarans suitable for the purposes of this invention include the methyl, ethyl, isobutyl, butyl, hexyl, octyl, 2-ethylhexyl, decyl, n-dodecyl and n-octadecyl methacrylates and acrylates; phenyl, cyclo-hexyl and p-cyclo-hexyl phenyl methacrylates, methoxyethyl, chloroethyl and 2-nitro-2-methylpropyl methacrylates, and the corresponding esters of acrylic acid; methyl and octyl alpha-chloroacrylates; phenyl vinyl, methyl isopropenyl and methyl vinyl ketones; acrylonitrile, methacrylonitrile; vinyl esters such as the chloride, acetate, propionate, chloro-acetate, and bromide; isopropenyl acetate; styrene and vinyl napthalene; ethyl vinyl ether; N-vinyl phthalimide, succinimide, and carbazole; acrylamide, methacrylamide and monoalkyl substitution products thereof; esters such as diethyl fumarate, maleate and itaconate, methylene diethyl malonate, dimethyl and dibutyl itaconate; dichloro-vinylidene fluoride; vinyl pyridine; maleic anhydride; allyl glycidyl ether and other unsaturated aliphatic ethers described in U.S. 2,160,943; and free acids such as itaconic, acrylic and methacrylic acids.

The coatings carried by the cellulosic base sheet of this invention may be applied by melt-extrusion, or from a lacquer or emulsion of the polymeric material. In the case of the polyolefin coatings, it is preferable to apply the coating by conventional melt extrusion procedures; see U.S. Patent No. 2,686,744 or application Serial No. 729,320 filed April 18, 1958. In the case of the vinylidene chloride interpolymers it is usually more practicable to apply the coating from a lacquer or emulsion.

Among the solvents of the sarans which are presently considered satisfactory for forming coating compositions are methyl isobutyl ketone, methyl ethyl ketone, tetrahydrofurane, cyclohexanone, isophorone, dioxane, and mesityl oxide; a variety of organic diluents may be used with these solvents. Other ingredients having various functions are ordinarily mixed in the solution of the saran. For example to improve the feel and frictional properties of a saran surface which affect the satisfactory passage of a film through packaging machinery, a hydrophobic wax such as paraffin wax, carnauba, a hydrogenated vegetable or animal oil, a high molecular weight aliphatic ketone such as stearone, or a low molecular weight polyethylene may be mixed with the saran. The waxes, particularly paraffin or the hydrogenated oils, may also improve the impermeability of the saran to vapors. Materials for plasticizing the saran may be included in a solution thereof, such as dibutyl phthalate, ethyl diglycol phthalate, methyl phthalyl methyl glycolate, tricresyl phosphate, trioctyl phosphate, dibenzyl sebacate, and the various other phthalates, glycolates, phosphates and sebacates known to the plastic mixing art. The saran solution may also include in suspension materials which prevent the sticking of engaged saran-coated surfaces; such materials include fine particle clay, silica gel and talic and/or ester waxes.

Since polyolefins, such as polyethylene and polypropylene, and the sarans are incompatible to the extent that they do not seal to each other even in the presence of heat and pressure, anti-sticking (anti-blocking) agents are unnecessary in the production of rolls of cellophane coated on one side with saran and on the other side with a polyolefin. These sheets may be prepared in accordance with this invention coated on one side with substantially pure saran by either solution or melt-extruding techniques. The pure saran coating being so thin (thickness of the order of 0.05 to 0.1 mil), that the coating is not brittle nor is the coated sheet stiff. The vapor impermeability is higher for thin coatings and may be improved, if desired, by homogeneous admixture with a small amount of wax.

The polyolefins used in this invention are of a variety of types, e.g. the resinous polyethylenes having molecular weights between 10,000 and 40,000 and density between 0.90 and 0.97 g./cc. Preferably the molecular weight is in the approximate range of 10,000 to 20,000 and the density in a range of about 0.91 to 0.95 g./cc. These latter ranges correspond to softening points in the range of 100° C. to 110° C. Polypropylene, on the other hand, having molecular weights of between about 10,000 and 100,000 are suitable for this invention. Preferably the polypropylene utilized according to this invention will possess molecular weights in the range of about 30,000 to 50,000, a density in the range of about 0.88 to 0.90 and a softening point in the range of about 100° to 125° C. The polyolefins, as normally used in this invention, are melt-extruded as films of pure polymer although they may be applied by known emulsion, solution, or powder technique and may be mixed with ingredients such as waxes, polyisobutylene and other compatible resins, dyes, pigments and fillers, for special purposes. In further explanation, the following examples describe specific procedures for practicing the invention.

*Example 1*

A sheet of washed regenerated cellulose in the wet gel state was passed through an acidic colloidal solution containing about 1–2 percent of partially polymerized melamine-formaldehyde condensation resin (Parez 607 manufactured by the American Cyanamid Co.). The sheet remained in the bath about 20 seconds and then passed into a plasticizing bath containing about 4 percent glycerine. The plasticized resin-impregnated sheet was then dried in the usual way in a conventional multiple roll dryer. Thereafter the dried sheet containing the condensation resin as an anchoring agent was coated on one side only with a 15 percent solution of a 90 vinylidene chloride-10 acrylonitrile copolymer in a solvent mixture comprising approximately 60 percent tetrahydrofurane and 40 percent toluene. The solution further contained dispersed therein about 0.4 part of extra fine clay and 2 parts castor wax (hydrogenated castor oil with a melting point of about 85° C.) for each 100 parts of the copolymer. After solvent removal by heating, the sheet was coated on its other side by extruding molten resinous polyethylene of molecular weight of about 18,000 downwardly onto the uncoated side of the sheet as it advanced into the nip of a pair of press rolls. The coating steps were regulated to obtain thickness of the saran of about 0.1 mil and a polyethylene thickness of approximately 0.25 to 2.0 mils. Sections of the sheet were thereafter formed into containers by folding the sections with the polyethylene side thereof constituting the inner surface and sealing the folded section along opposed polyethylene coated surfaces by heat and pressure. With one side of each container thus formed left open, the containers were adapted to be filled with foodstuffs or other goods. Several containers were partly filled with meat products. The open end of each container so filled was gathered tightly around the end of a suction tube and the air pressure within the container reduced to 15 inches of vacuum to collapse the container about the meat. Heat and pressure was applied to the collapsed neck of the container just beyond the end of the suction tube to interfuse portions of the polyethylene coating and obtain a sealed meat package of which all portions were pressed tightly against the surfaces of the meat. The container remained permanently collapsed and adhered to the surface of the meat.

*Example 2*

A sheet of washed regenerated cellulose in the wet gel state was passed through a plasticizing solution containing about 5 percent glycerine and 0.5 percent of polyethylenimine and thereafter dried in the usual manner. The latter ingredient was added because of its effectiveness in anchoring vinyl resins to cellophane. The dried sheet was thereafter coated on one side only with a 10 percent solution of 93 vinylidene chloride-7 vinyl chloride copolymer (Saran B115) in a solvent mixture of 60 parts dioxane and 40 parts toluene. The coating procedure was regulated to provide a coating of approximately .08 mil thickness after the removal of solvent by heating. The dried saran coating was dusted with talc after being discharged from the drier to render the surface thereof non-tacky. Thereafter the sheet was coated with polyethylene as described in Example 1. The sheet was cut into sections and the sections folded with the polyethylene surface to the inside and heat sealed along the margins thereof to form envelopes suitable for receiving foods such as potato chips, peanuts, coffee, edible fats, and other relatively dry foods which deteriorate in the presence of air. The final seal was made with the envelopes by partial inflation with nitrogen from a condition of complete evacuation. After a month, the gaseous contents were examined and found to contain no significant contamination by oxygen.

*Example 3*

A sheet of cellophane in a washed, wet gel state was passed through a plasticizing solution containing about 5 percent glycerine and 0.8 percent of a partly polymerized cationic melamine-formaldehyde condensation product (anchoring agent for the coatings later applied) and thereafter dried. One side of the dried cellophane was thereafter coated by melt-extrusion with a 85 vinylidene chloride-15 acrynonitrile copolymer having milled therein about 2 parts of paraffin wax to 100 parts of the polymer. The coating process was conducted at such a rate as to deposit a saran film of approximately 0.2 mil in thickness. Practically simultaneously, a molten film of polyethylene was applied to the other side of the cellophane base at a rate such as to deposit a product with a coating of approximately 1 mil in thickness. The saran-polyethylene coated sheet then passed through a pair of chilled pressure rolls and was wound into a product roll with the saran surface facing against the polyethylene surface. Although the coatings contained no anti-sticking ingredients, the roll could be unwound without the slightest tendency of the windings thereof to stick together. The coatings were found to adhere firmly to the base sheet even when sections of the coated sheet were soaked in water for a period of one week. Sections of the roll were folded with their polyethylene surfaces facing inwardly and heat sealed along the edges to form bags. A number of the bags were packed with sponge rubber blocks and sealed with the interior thereof subjected to a vacuum of 25 inches of mercury. In those bags having perfect seals, the sponge rubber blocks remained in a compressed state as the result of pressure by the walls of the bags at the end of 30 days.

All of the envelopes, containers, and bags of the above examples are found to have good dimensional stability, i.e., freedom from excessive wrinkling when wrapped tightly about the goods packaged thereby. Moreover, all of such packaging materials are highly satisfactory for use in applications wherein a high degree of grease-proofness and resistance to the deterioration of sugary materials such as dates, confections, etc., is desired. These heat sealable containers are particularly useful, because of their high vapor impermeability and chemical resistance, in packaging materials which are adversely affected by traces of unwanted gases.

*Example 4*

A regenerated cellulose film coated on opposing surfaces was prepared by repeating the procedure of Example 1, substituting polypropylene having an average molecular weight of about 40,000 and a density of about 0.88 to 0.90 for the polyethylene and a melamine-formaldehyde-polyalkylene polyamine resin (Accobond 3900 made by the American Cyanamid Company) for the melamine-formaldehyde resin of Example 1.

I claim:

1. A heat sealable wrapping material comprising a flexible composite sheet having a base film derived from a cellulosic material selected from the group consisting of regenerated cellulose and a cellulose ether, a coating comprising an interpolymer primarily vinylidene chloride on one side of said base film adapted to form the outer surface of a wrapping for a package, and a coating of a polyolefin on the other side of said base film adapted to form the inner surface of said wrapping, and a material anchoring said coatings to said base film, said wrapping being sealable by joining portions of polyolefin-coated surface in the presence of heat and pressure.

2. A heat sealable wrapping sheet comprising a base film composed of a material selected from the group consisting of a cellulose ether and a regnerated cellulose film, a coating of an interpolymer primarily vinylidene chloride on one side of said base film, a coating of a polyolefin on the other side of said base film, a material anchoring said coatings to said base film, said polyolefin coatings having a thickness not less than that required for satisfactorily heat sealing opposed engaged polyolefin coated surfaces of said sheet.

3. The heat sealable wrapping sheet of claim 2 wherein said coating of a polyolefin is a polyethylene coating having a thickness of approximately 0.15 mil to 2.0 mils and said vinylidene chloride interpolymer coating has a thickness of approximately 0.05 to 0.1 mil.

4. The heat sealable wrapping sheet of claim 3 wherein said base film is regenerated cellulose.

5. The heat sealable wrapping sheet of claim 3 wherein said base film is hydroxyethylcellulose.

6. The heat sealable wrapping sheet of claim 2 wherein said coating of a polyolefin is a polypropylene coating having a thickness of approximately 0.15 mil to 2.0 mils and said vinylidene chloride interpolymer coating has a thickness of approximately 0.005 to 0.1 mil.

7. The heat sealable wrapping sheet of claim 6 wherein said base film is regenerated cellulose.

8. The heat sealable wrapping sheet of claim 6 wherein said base film is hydroxyethyl cellulose.

9. A heat sealable composite sheet comprising a base film selected from the group consisting of hydroxyethyl cellulose and regenerated cellulose; a coating on one side of said base film comprising an interpolymer which is primarily vinylidene chloride, a hydrophobic wax and an anti-blocking agent; a coating of a polyolefin selected from the group consisting of polyethylene and polypropylene on the other side of said base film, and a material carried by said base film anchoring said coatings thereto, said composite sheet being heat sealable along polyolefin coated portions thereof.

10. A container comprising a flexible sheet material consisting essentially of a base film selected from the group consisting of regenerated cellulose film and hydroxyethyl cellulose film, a coating comprising an interpolymer primarily of vinylidene chloride on one side of said base film, forming the outer surface of said container, a coating of a polyolefin selected from the group consisting of polyethylene and polypropylene on the other side of said base film forming the inner surface of said container, and a material anchoring said coatings to said base, said container being sealed by coalesced opposing polyolefin-coated surfaces of said sheet material.

11. The container of claim 10 sealed with the interior thereof at sub-atmospheric pressure.

12. A package comprising the container of claim 10 with contents carried therein and containing as substantially the only gaseous material enclosed thereby a gas that is inert to said contents and said sheet material.

13. The package of claim 12 wherein said gas is nitrogen.

14. A package comprising the container of claim 10 with contents carried therein and with gaseous matter substantially withdrawn therefrom to contract said container tightly about said contents.

15. A heat sealable container comprising a flexible composite sheet consisting essentially of a base film selected from the group consisting of regenerated cellulose film and hydroxyethyl cellulose film, a coating comprising an interpolymer primarily of vinylidene chloride on one side of said base forming the outer surface of said container, a coating of a polyolefin selected from the group consisting of polyethylene and polyproplyene on the other side of said base forming the inner surface of said container, said polyolefin coating having a minimum thickness of approximately 1 mil adapting said container for heat sealing, and a material carried by said base anchoring said coatings thereto, said container being sealed by joined portions of said polyolefin coated surface.

16. A heat sealable container comprising a flexible composite sheet comprising a base film of regenerated cellulose, a coating on one side of said base comprising an interpolymer selected from the group consisting of copolymers comprising a predominant amount of vinylidene chloride and a minor amount of a material selected from the group consisting of alkyl methacrylates containing 8–18 carbon atoms in the alkyl group thereof, vinyl chloride, acrylonitrile, alkyl acrylates containing 6–18 carbon atoms in the alkyl group thereof and mixtures of said methacrylates with alkyl acrylates containing 1–8 carbon atoms in the alkyl chain thereof, a coating of polyolefin selected from the group consisting of polyethylene and polypropylene on the other side of said base forming the inner surface of the container, a material anchoring said coatings to said base film, said container being sealed along interfused portions of the polyolefin coated surface.

References Cited in the file of this patent
FOREIGN PATENTS

| | | |
|---|---|---|
| 790,200 | Great Britain | Feb. 5, 1958 |
| 790,201 | Great Britain | Feb. 5, 1958 |